United States Patent [19]
Miura

[11] Patent Number: 5,418,629
[45] Date of Patent: May 23, 1995

[54] CONTROL DEVICE FOR A READER MOTOR

[75] Inventor: Shigeo Miura, Tokyo, Japan

[73] Assignee: Canon Kabushiki Kaisha, Tokyo, Japan

[21] Appl. No.: 126,771

[22] Filed: Sep. 27, 1993

[30] Foreign Application Priority Data

Oct. 2, 1992 [JP] Japan .................. 4-264898

[51] Int. Cl.6 ............................................. H04N 1/40
[52] U.S. Cl. .................... 358/471; 358/486; 358/420
[58] Field of Search ............... 358/471, 451, 474, 486, 358/137, 405, 409, 412, 413, 420; 355/235

[56] References Cited

U.S. PATENT DOCUMENTS

| | | | |
|---|---|---|---|
| 4,130,838 | 12/1978 | St. John | 358/412 |
| 4,330,195 | 5/1982 | Lavallee | 355/3 R |
| 4,864,416 | 8/1989 | Ishikawa | 358/486 |
| 4,972,273 | 11/1990 | Burkhardt et al. | 358/471 |
| 5,030,994 | 7/1991 | Roman et al. | 355/235 |
| 5,043,827 | 8/1991 | Beikirch | 358/471 |
| 5,146,272 | 9/1992 | Watanabe | 355/208 |
| 5,290,205 | 3/1994 | Densmore et al. | 482/54 |
| 5,296,939 | 3/1994 | Suzuki | 358/538 |

FOREIGN PATENT DOCUMENTS 0034499 8/1981 European Pat. Off. .
3234164 10/1991 Japan .

Primary Examiner—Edward L. Coles, Sr.
Assistant Examiner—Madeleine Nguyen
Attorney, Agent, or Firm—Fitzpatrick, Cella, Harper & Scinto

[57] ABSTRACT

When the operating mode of a facsimile apparatus relates to only the reading of an original to be transmitted, coding, and storage into an image memory, the reading of the original, coding of the image signal, and storage of the image signal are executed at regular intervals. In the case where the operating mode relates to the case where not only the reading of the original, coding, and storage into the image memory are executed but also the communication, printing of the received image, or printing of a communication management report is simultaneously executed, the reader motor is rotated within a pull-out region asynchronously with the timing for the reading of the original, coding, and storage into the image memory.

5 Claims, 7 Drawing Sheets

| FIG. 2A |
| FIG. 2B |

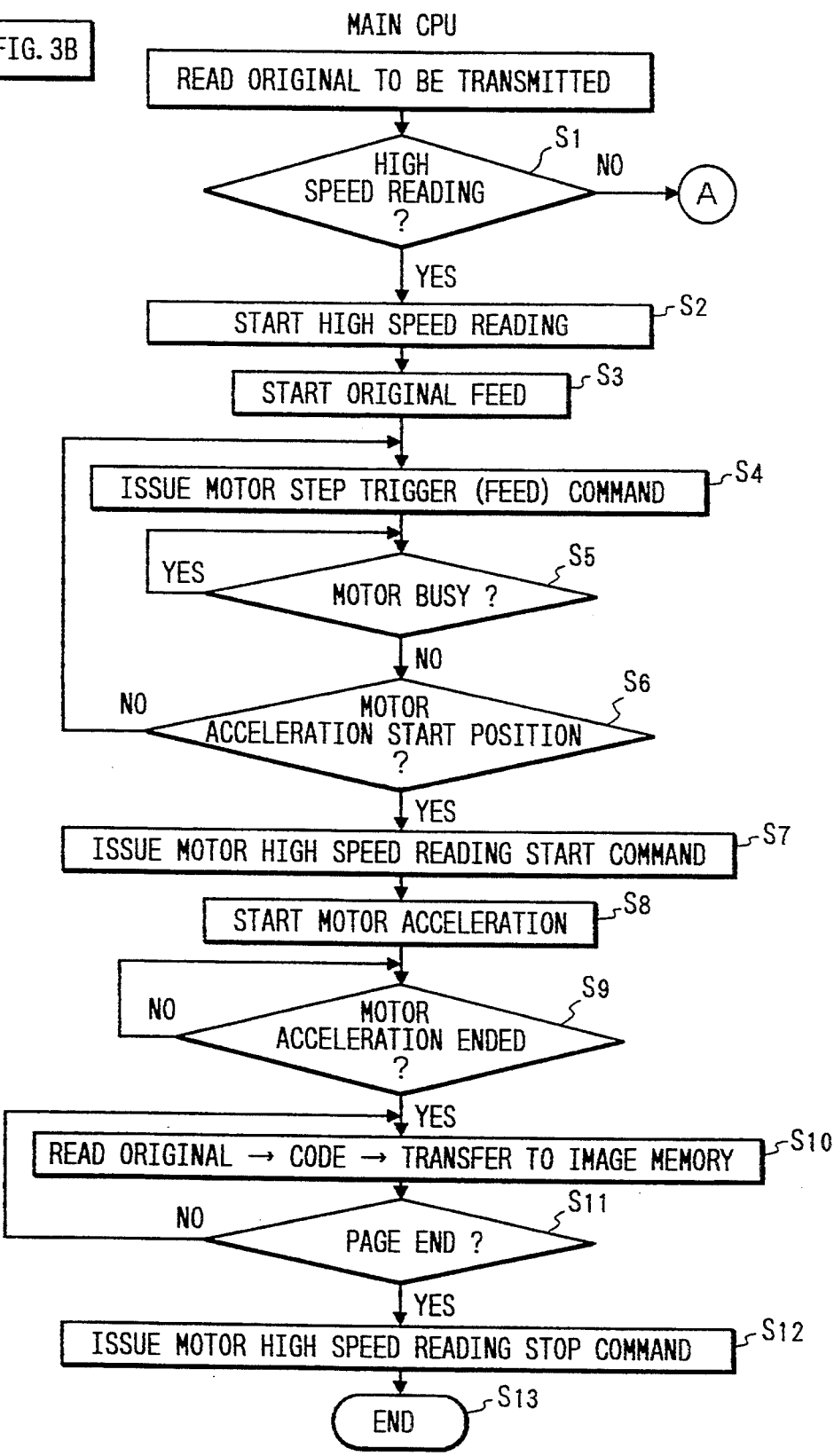

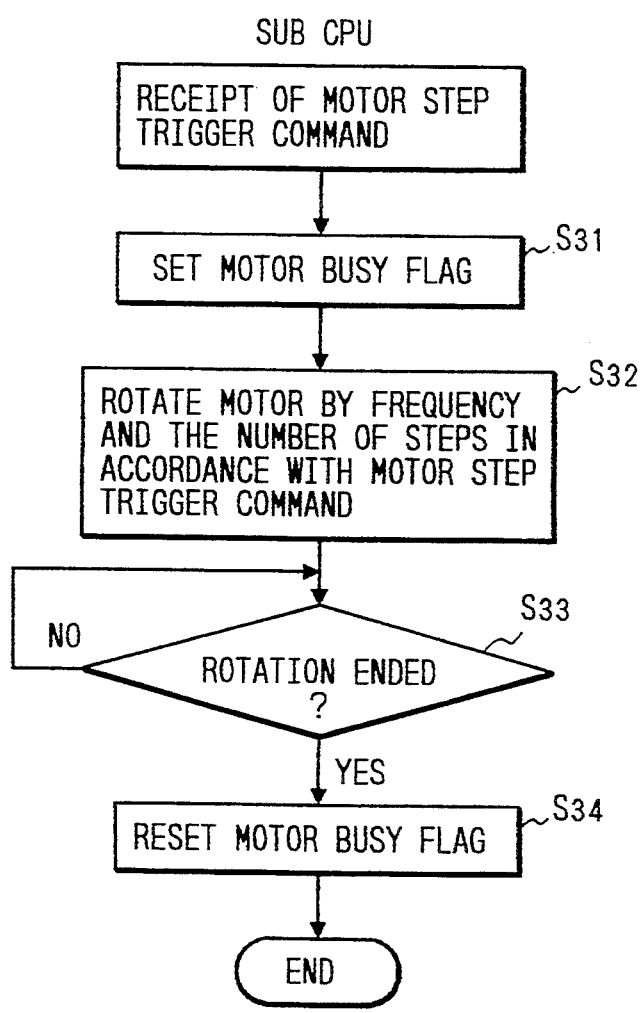

CONTROL DEVICE FOR A READER MOTOR

BACKGROUND OF THE INVENTION

1. Field of the Invention

The present invention relates to a facsimile apparatus and, more particularly, to the control of a reader motor to read an original to be transmitted by a facsimile apparatus.

2. Related Background Art

A conventional facsimile apparatus has not only a main CPU to control the whole apparatus but also a sub CPU to control a reader motor to move a reading original to a reading position. When the motor is rotated in the above construction, a motor trigger command and information indicative of the number of motor steps for the motor trigger are supplied from the main CPU to the sub CPU, thereby rotating the motor.

Such a construction also applies to a facsimile apparatus which has an image memory and in which an image signal which has been read and coded is stored into the image memory at a high speed, namely, a facsimile apparatus having a high speed reading mode.

In case of the high speed reading, it is necessary to set the reading timing to be almost constant and to rotate the reader motor at a high speed.

For this purpose, there is considered a method of rotating the reader motor at a high speed within a pull-out torque by the acceleration control. That is, to rotate the motor at a higher speed within a pull-in torque, it is necessary that a large powerful expensive motor be used in the apparatus. Therefore, such a method is effective in case of providing a small cheap apparatus to the user.

In the above conventional facsimile apparatus, namely, in a facsimile apparatus which has an image memory and stores image data into the image memory at a high speed and, after that, transmits or copies the signal stored in the image memory, that is, performs the high speed reading, and in which the acceleration control of the motor is executed to rotate the reader motor at a high speed and the motor is used in the pull-out torque, it is necessary to issue the motor trigger command from the main CPU to the sub CPU at a high constant speed.

When the motor trigger command is issued, a check is made to see if the motor is busy or not on the basis of the information from the sub CPU and, thereafter, the motor trigger command is issued. Therefore, as the rotational speed of the motor is raised as high as possible, it is necessary to make the timing to check such a motor busy status and the timing to issue the motor trigger command as fast as possible. In the case where the motor trigger timing is deviated by some cause, there occurs a serious problem such that since the motor is used within the pull-out torque, the motor loses synchronism, the original to be transmitted cannot be conveyed, and the same position of the original is permanently read.

Particularly, in a facsimile apparatus which operates in what is called a dual access mode such that while the image is being read at a high speed, another process such as communication, printing of the received image, printing of a communication management report, or the like is also simultaneously executed, a direct memory access (DMA), an interrupting process, or the like to execute a process other than the high speed image reading exerts an influence on the timing of the motor trigger. Among them, the process regarding the communication needs to be executed at a highest priority because the communication transmitting speed and the timing for communication protocol have severely been determined by the standard such as CCITT or the like. Therefore, in case of performing the high speed image reading during the communication, there frequently occurs a problem such that the motor trigger timing is deviated due to the influence by the communication and the motor cannot be rotated at a constant speed within the pull-out torque because of such a timing deviation, so that the motor loses synchronism.

SUMMARY OF THE INVENTION

It is an object of the invention to solve the above problems and to perform the driving control of a reader motor in accordance with a reading mode.

The above and other objects and features of the present invention will become apparent from the following detailed description and the appended claims with reference to the accompanying drawings.

BRIEF DESCRIPTION OF THE DRAWINGS

FIG. 4 is an operation flowchart when a motor step trigger command of a sub CPU shown in FIGS. 2A and 2B is received.

DETAILED DESCRIPTION OF THE PREFERRED EMBODIMENTS

An embodiment of the invention will now be described hereinbelow with reference to the drawings.

Figure 1:
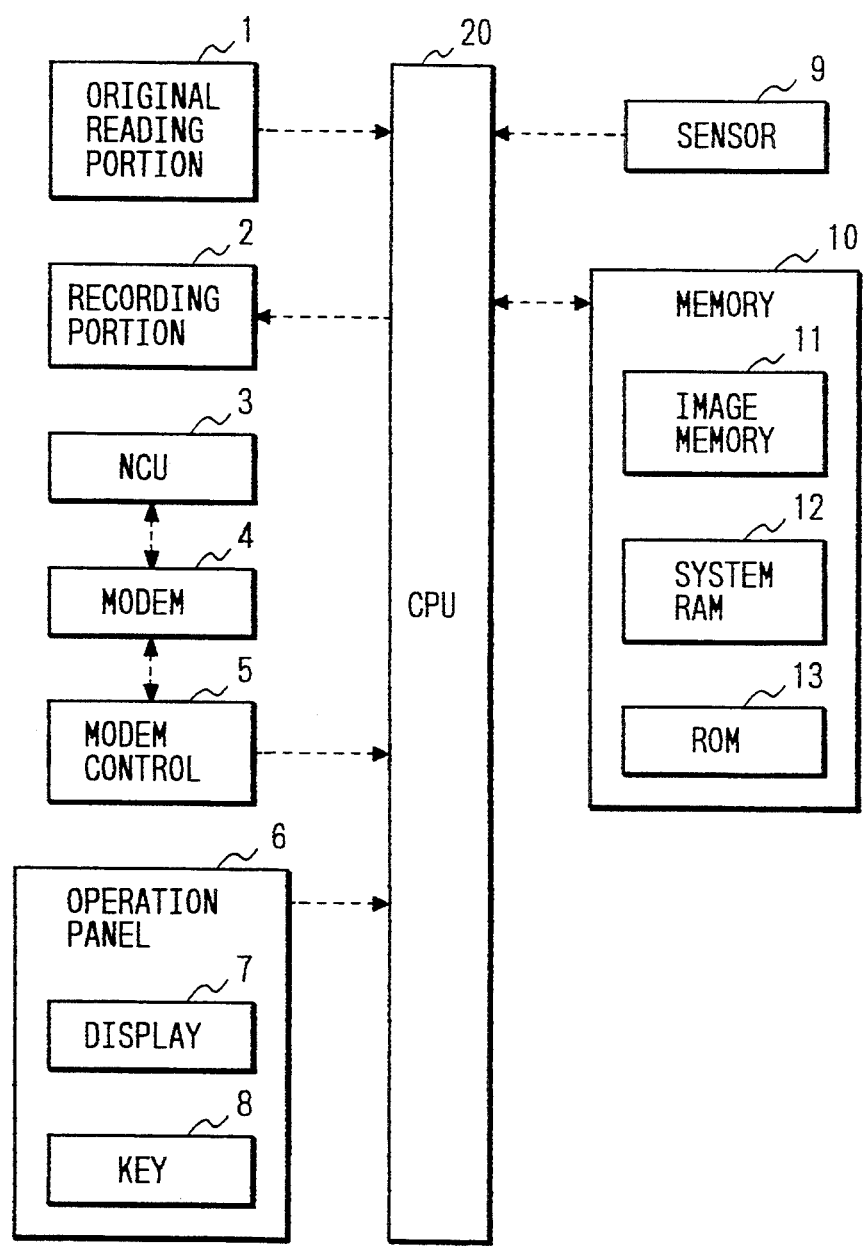
FIG. 1 is a control block circuit diagram of a whole facsimile apparatus showing an embodiment of the invention.

FIG. 1 is a control block diagram of a whole facsimile apparatus. In FIG. 1, reference numeral 1 denotes an original reading portion to read an original to be transmitted and to convert it into image data; 2 a recording portion to print the received image, communication result report, or the like; 3 a network control unit (NCU) to connect a telephone line to the facsimile; 4 a modulating demodulating apparatus, namely, modem to perform communication; 5 a modem control to control the modem 4; 6 an operation panel; 7 a display to display a status of the facsimile to the user; 8 a group of keys which are provided on the operation panel 6 and are used for the user to indicate various kinds of operations to the facsimile; 9 a sensor to detect the status of the facsimile; 10 a memory; 11 an image memory to store the received image data or the like; 12 a system RAM (or system memory) which is backed up by a battery or the like so that data is not destroyed even during a power shut-off of a commercially available power source such as a power failure or the like; 13 an ROM to device the specification of the facsimile; and 20 a central processing unit to control each portion.

Figures 2, 2A:
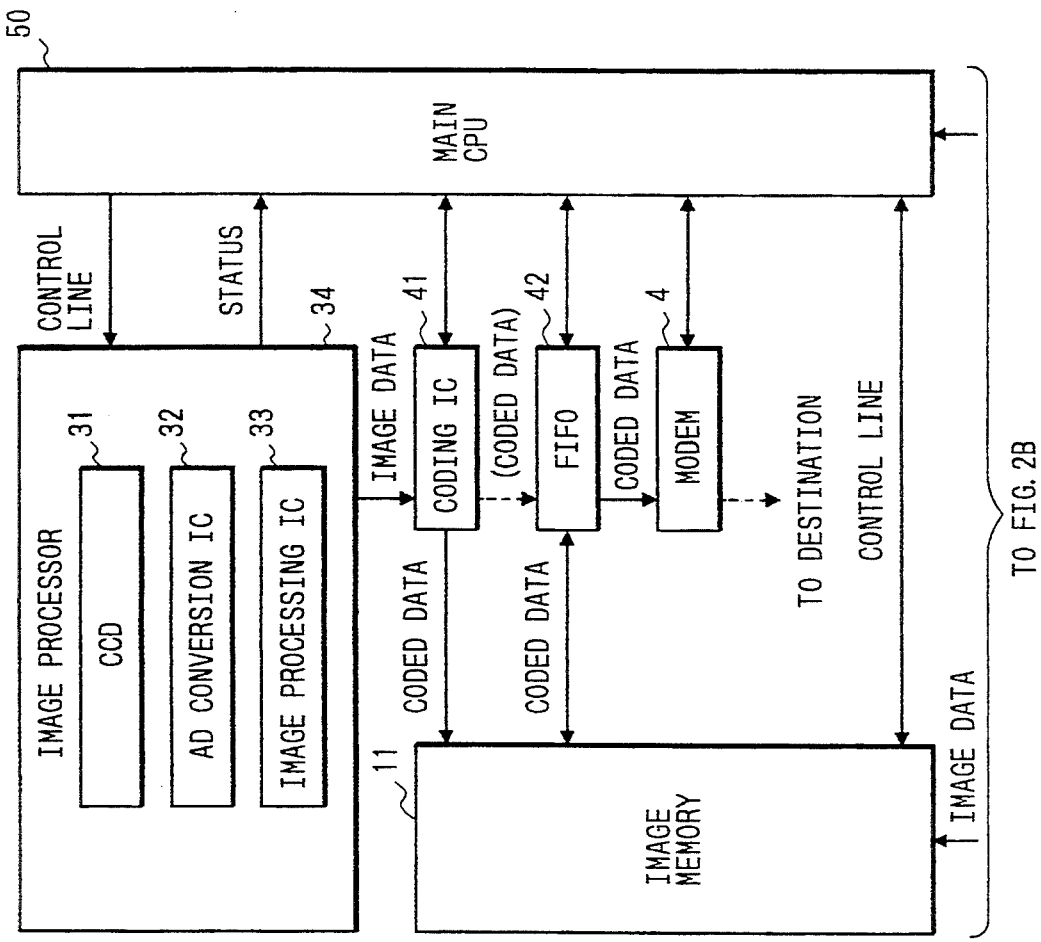
FIG. 2 is comprised of FIGS. 2A and 2B showing detailed control block diagrams of an original reading portion and a recording portion shown in FIG. 1.
Figure 2B:
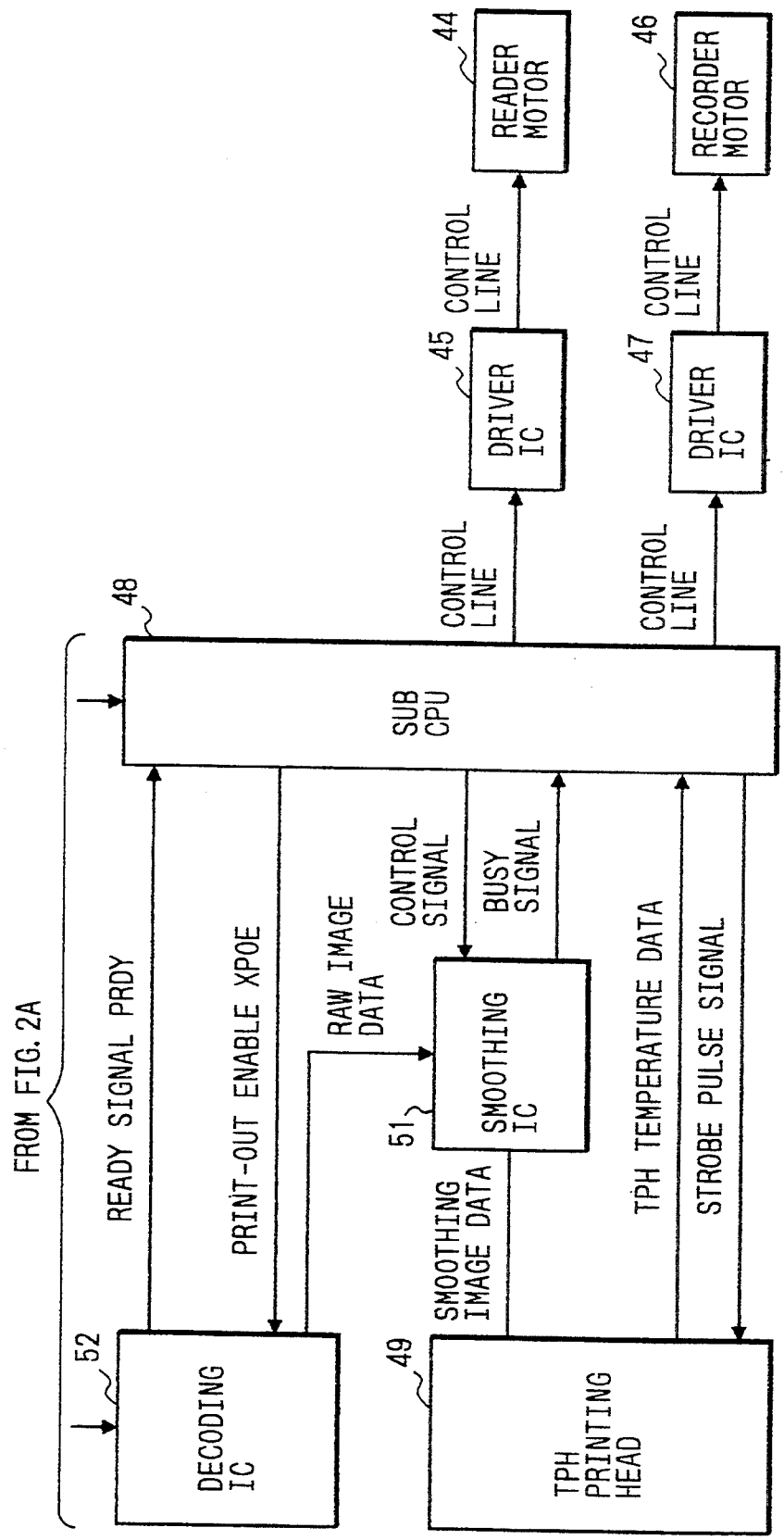

FIGS. 2A and 2B are detailed control blocks of the original reading portion 1 and central control 20 in FIG.

1. In FIGS. 2A and 2B, reference numeral 31 denotes a CCD as a photoelectric converting element for reading the original to be transmitted and converting into it the electric signal; 32 an AD conversion IC to convert the electric signal from the CCD 31 into the digital signal; 33 an image processing IC to execute an image process such as conversion into an error diffusion signal in a half tone, edge emphasis, or the like to an output signal of the AD conversion IC 32; 34 an image processor including the CCD 31, AD conversion IC 32, and image processing IC 33; 41 a coding IC for coding image data from the image processor 34 into the signal of MH (Modified Huffman), MR (Modified Read), or the like; 42 an FIFO (First-in First-out) to interface between the coding IC 41 and the modem 4; 11 the image memory shown in FIG. 1; 44 a reader motor as a stepping motor to convey the original to be transmitted to the original reading position; and 45 a driver IC for changing a phase exciting current of the reader motor 44, thereby driving the motor 44. The original reading portion 1 in FIG. 1 is constructed by the reader motor 44 and the current driver 45. reference numeral 46 denotes a recorder motor to convey a recording paper; and 47 a current driver to supply a current which is necessary to make the recorder motor 46 operative. The recording portion 2 in FIG. 1 is constructed by the recorder motor 46 and the current driver 47. Reference numeral 48 denotes a sub CPU to control a printing head 49 such as thermal head TPH to print or the like and the motors 44 and 46; 50 a main CPU to control the above component elements; 51 a smoothing IC for interpolating data between the lines to be printed, thereby improving the image quality; and 52 a decoding IC for decoding the coded signal such as coded data or the like sent from a destination transmitter and supplying as raw image data to the smoothing IC 33. The central control 20 in FIG. 1 is constructed by the sub CPU 48, printing head 49, smoothing IC 51, decoding IC 52, and main CPU 50. Each of the motors 44 and 46 is a stepping motor.

As mentioned above, according to an embodiment of the invention, it is possible to select the high speed reading mode and the direct reading mode. In the high speed reading mode, the original to be transmitted is read by the image processor 34, the image signal formed by the image processor 34 is coded by the coding IC 41 and stored into the image memory 11, and the read signal of the original stored in the image memory 11 is transmitted or copied. In the direct reading mode, the original to be transmitted is read and coded and the coded image signal is communicated without storing. When the operating mode relates to only the reading of the original to be transmitted, coded, and stored into the image memory 11, the reading of the original, the coding of the image signal, and the storage of the image signal are executed at regular intervals. Only when the operating mode relates to the dual access mode in which not only the reading of the original, coding, and storage into the image memory are executed but also the communication, printing of the received image, or printing of the communication management report is simultaneously executed, the reader motor is rotated in the pull-out region asynchronously with the timings for reading the original, coding, and storing into the image memory. Due to this, a deviation of the timings for the reading of the original, coding and storage into the image memory when the high speed image reading is executed in the dual access mode causes a fluctuation of the rotating frequency of the reader motor, so that the loss of synchronism of the motor is prevented. The apparatus has not only the main CPU to control the whole apparatus but also the sub CPU to control the reader motor to move the reading original to the reading position. In the high speed reading mode, a start command is issued from the main CPU to the sub CPU. After the rotational speed of the motor has become a constant speed by the acceleration control or the like by the start command, the sub CPU rotates the reader motor at a constant speed within the pull-out region. Subsequently, so long as a stop command is not generated from the main CPU to the sub CPU, the motor is continuously rotated at a constant speed asynchronously with the reading of the original to be transmitted, coding, and storage into the image memory. When the apparatus is set into the direct reading mode, the motor trigger command and the information indicative of the number of motor steps are transferred from the main CPU to the sub CPU, and the motor is rotated in the pull-in region synchronously with the reading of the original, coding, and storage into the image memory.

The operation of the above apparatus with the above construction will now be described.

Even in case of the dual access mode in which the original reading portion 1 and the recording portion 2 simultaneously operate, when the image data of the original to be transmitted is stored into the image memory 11 at a high speed, the main CPU 50 issues the start command to the sub CPU 48. In this instance, the sub CPU 48 operates in accordance with FIG. 5. Namely, even when the motor trigger command is not received from the main CPU 50, the motor is accelerated and is rotated at a constant speed. In the direct reading mode in which the image memory is not used, the sub CPU 48 operates in accordance with FIG. 5. Namely, the motor is not accelerated but is rotated at a frequency so that it can be rotated within the pull-in torque. By transmitting the motor trigger command while checking the status of the FIFO or the like by the main CPU 50, the reading operation is executed.

In the dual access mode, in case of simultaneously performing high speed image reading and receiving operations, the image signal read by the image processor 34 is coded by the coding IC 41. The coded data is transferred and stored into the image memory 11. At the same time, the data received by the modem 4 is stored into the image memory 11 through the FIFO 42. After that, the data is transferred to the decoding IC 52 and is decoded by the decoding IC 52. The decoded printing data is transferred to the thermal printing head 49 through the smoothing IC 51 and is strobe controlled by the sub CPU 48 and is printed onto a recording paper. There is also a case where when the data is received, the data is not sent to the image memory 11 but is transferred from the FIFO 42 to the decoding IC 52. In the above data reception, the data transfer from the modem 4 to the FIFO 42 and the data transfer from the FIFO 42 to the image memory or from the decoding IC 52 or image memory 11 to the decoding IC 52 are executed by a DMA or interrupting process. The above process is executed preferentially over the high speed image reading process and exerts an influence on the reading timing.

Figure 3B:
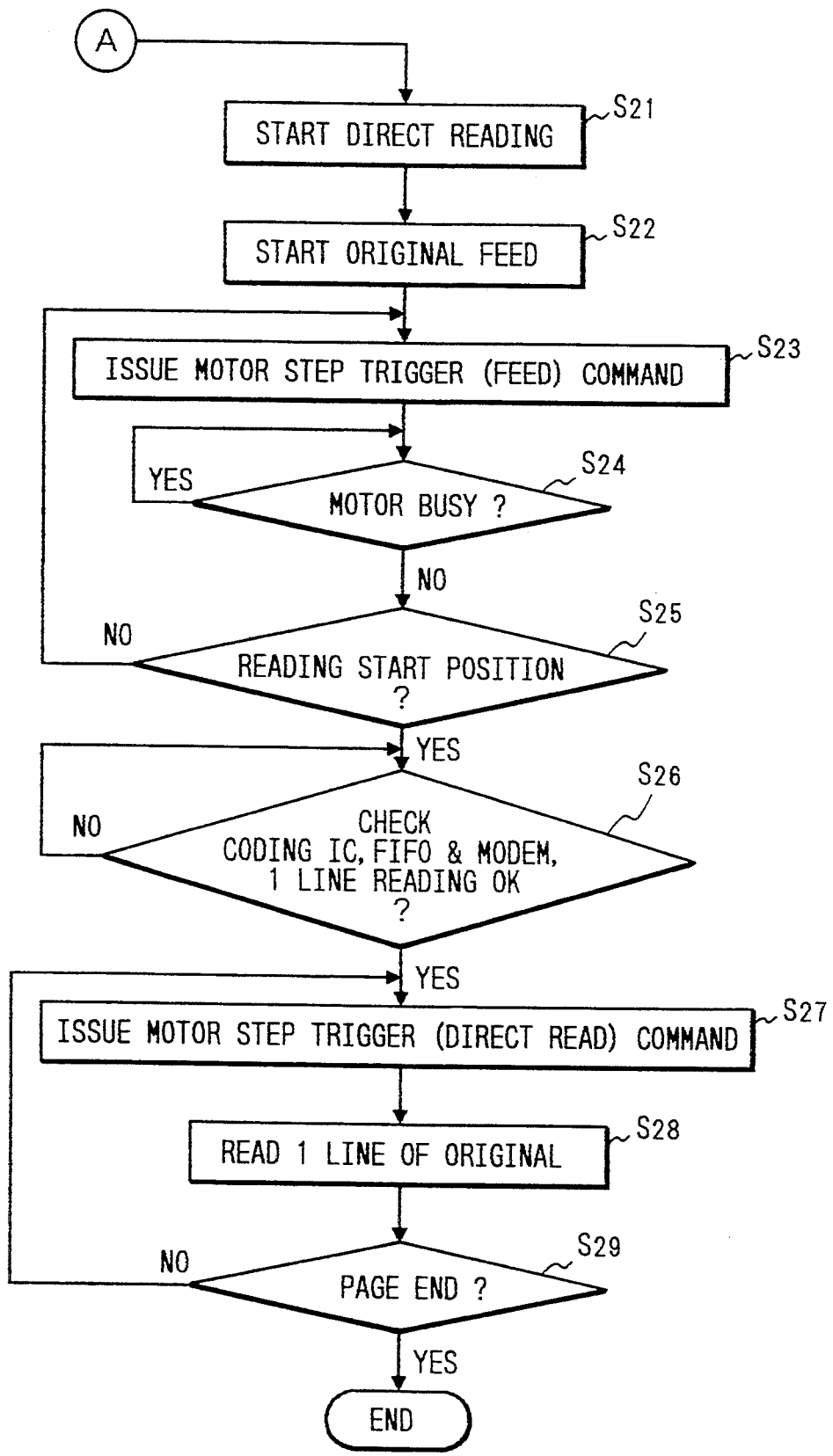
FIG. 3 is comprised of FIGS. 3A and 3B showing operation flowcharts of a main CPU shown in FIGS. 2A and 2B.

The operation of the main CPU 50 will now be described with reference to flowcharts of FIGS. 3A and 3B. In step S1, a check is made to see if the original reading mode is set to the high speed memory reading mode or not. If YES, the high speed reading is started in step S2. In case of the direct reading, the direct reading is started in step S21. In case of executing the high speed memory reading in step S2, the original feed is started in step S3. The motor step trigger command is generated in step S4. When the motor step trigger command is issued, the sub CPU 48 receives the command and executes the processes in a flowchart shown in FIG. 4. Namely, the sub CPU 48 sets a motor busy flag to 1 in step S31. In step S32, the reader motor 44 is rotated at a frequency according to the motor step trigger command and by only the number of steps. In step S33, a check is made to see if the rotation of the reader motor 44 has been finished or not. The reader motor 44 is rotated by a predetermined number of steps. When the end of rotation is judged, the motor busy flag is reset to 0 in step S34. The operation of the sub CPU 48 due to the generation of the motor step trigger command is finished.

Figure 5:
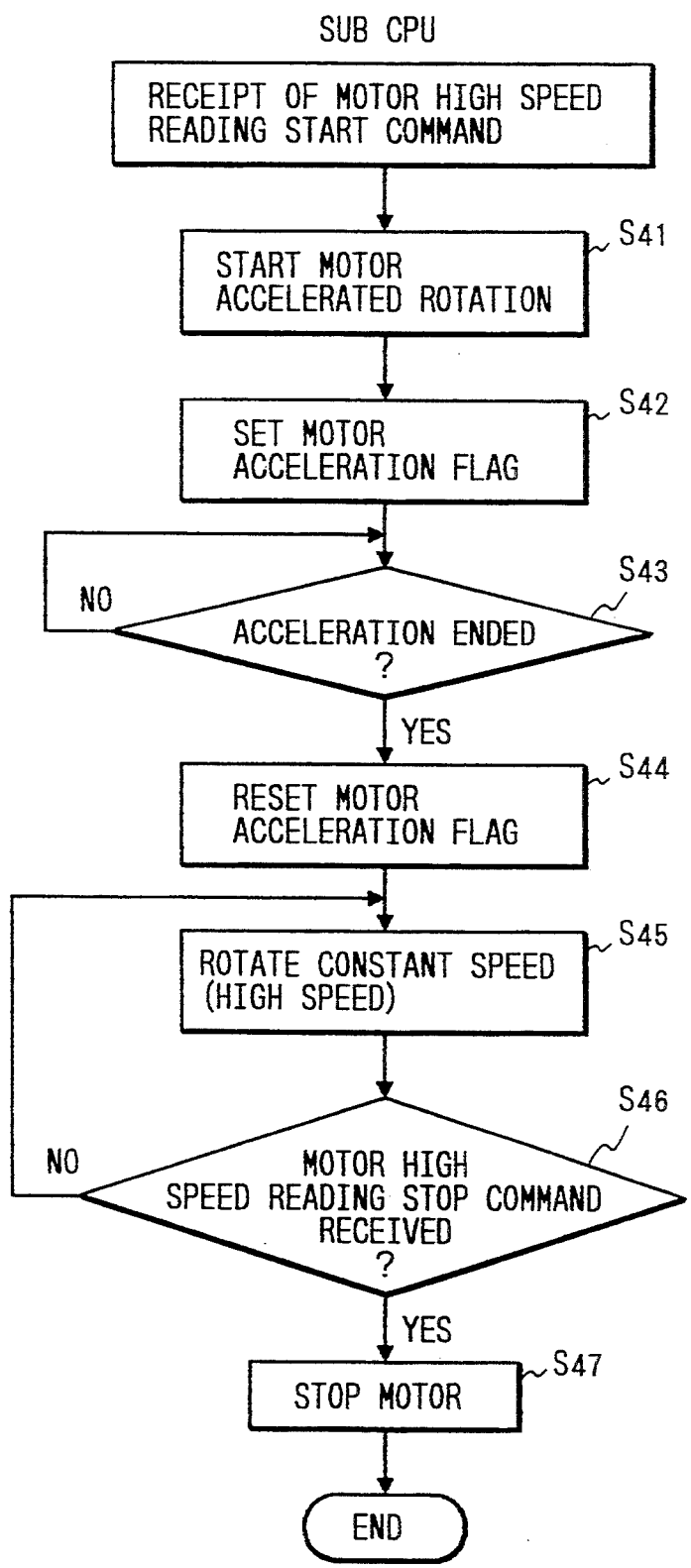
FIG. 5 is an operation flowchart when a motor high speed reading start command of the sub CPU shown in FIGS. 2A and 2B is received.

In the main CPU, a check is made in step S5 to see if the motor busy flag of the sub CPU 48 has been reset or not. When the motor busy flag is reset, a check is made in step S6 to see if the motor is located at the motor acceleration start position or not. If NO, the processing routine is returned to step S4 and the motor step trigger command is generated. However, when the motor is located at the motor acceleration start position, a motor high speed reading start command is issued in step S7. Due to this, the acceleration of the motor is started in step S8. The operation in step S8 is performed by the sub CPU 48. The operation of the sub CPU 48 is shown in FIG. 5. When the motor high speed reading start command is received, the sub CPU 48 starts the acceleration rotation of the reader motor 44 in step S41. In step S42, a motor acceleration flag is set to 1 in step S42. A check is made in step S43 to see if the acceleration of the reader motor 44 has been finished or not. If YES, the motor acceleration flag is reset to 0 in step S44. In step S45, the reader motor 44 is rotated at a high constant speed. In step S46, the reader motor 44 is rotated at a high speed until the high speed reading stop command is received. When the motor high speed reading stop command is received, the rotation of the reader motor 44 is stopped in step S47 and the operation of the sub CPU 48 due to the reception of the motor high speed reading start command is finished.

In step S9, a check is made to see if a motor acceleration flag of the sub CPU 48 has been reset or not. If YES, step S10 follows. In step S10, the original is read by the image processor 34 of the original reading portion 1, the read data is coded by the coding IC 41, and the coded data is transferred and stored into the image memory 11.

In step S11, a check is made to see if a reading position of the original has reached the page end or not. If NO, the operation in step S10 is repeated. If YES, the motor high speed reading stop command is issued in step S12. The rotation of the reader motor 44 is stopped and the operation in the high speed memory reading mode is stopped.

In case of performing the direct reading in step S21, the feeding operation of the original is started in step S22. In step S23, the motor step trigger command is issued. When the motor step trigger command is issued, the sub CPU 48 receives the command and executes a processing flow shown in FIG. 4. That is, the sub CPU 48 sets the motor busy flag in step S31. In step S32, the reader motor 44 is rotated by only the frequency and the number of steps according to the motor step trigger command. In step S33, a check is made to see if the rotation of the reader motor 44 has been finished or not. The reader motor 44 is rotated by only a predetermined number of steps. When the end of rotation is judged, the motor busy flag is reset in step S34 and the operation of the sub CPU 48 due to the generation of the motor step trigger command is finished.

The main CPU checks to see if the motor busy flag of the sub CPU 48 has been reset or not in step S24. When the motor busy flag is reset, a check is made in step S25 to see if the motor is located at the reading start position or not. If NO, the processing routine is returned to step S23 and the motor step trigger command is issued. However, when the motor is located at the reading start position, the coding IC 41, FIFO 42, and modem 4 are checked in step S26, thereby judging whether one line of the original can be read or not. If YES, the motor step trigger command is issued in step S27. When the motor step trigger command is issued, the sub CPU 48 receives the command and executes the processing flow shown in FIG. 4. That is, the sub CPU 48 sets the motor busy flag in step S31. In step S32, the reader motor 44 is rotated by only the frequency and the number of steps according to the motor step trigger command. In step S33, a check is made to see if the rotation of the reader motor 44 has been finished or not. When the reader motor 44 is rotated by the predetermined number of steps and the end of rotation is judged, the motor busy flag is reset in step S34. The operation of the sub CPU 48 due to the generation of the motor step trigger command is finished.

In the main CPU, the original is read by the image processor 34 of the original reading portion 1, the read data is coded by the coding IC 41, and the coded data is sent to the modem through the FIFO 42 and to the line. In step S29, a check is made to see if the reading position of the original has reached the page end or not. If NO, the operations in steps S27 and S28 are repeated. In case of the page end, the operation in the direct reading mode is finished.

According to the invention as described in detail above, there is provided the facsimile apparatus having the high speed reading mode in which the original to be transmitted is read at a high speed and coded and stored into the image memory and, after that, the original read signal stored in the image memory is transmitted or copied and the direct reading mode in which the original to be transmitted is read and coded and the coded image signal is communicated without storing, wherein in the high speed reading mode, simultaneously with the storage of the original into the image memory, the communication, the printing of the received image, or the printing of the communication management report can be performed. In the above facsimile apparatus, in the case where the operating mode relates to only the reading of the original to be transmitted, coding, and storage into the image memory, the reading of the original, coding of the image signal, and the storage of the image signal are executed at regular intervals. When the operating mode is the dual access mode in which not only the reading of the original to be transmitted, coding, and storage into the image memory are executed but also the communication, the printing of the received image, or the printing of the communication management report are simultaneously executed, a deviation of the timing for the reading of the original to be transmitted, coding, and storage into the image memory when the high speed image reading in the dual access mode is executed by rotating the reader motor within the pull-out region asynchronously with the timing for the reading of the original, coding, and storage into the image memory causes a fluctuation of the rotating frequency of the reader motor. It is prevented that such a fluctuation results in a loss of synchronism of the motor.

What is claimed is:

1. A facsimile apparatus having a high speed reading mode in which read data is coded and stored and the stored data is communicated and a direct reading mode in which the read data is coded and the coded data is communicated, said apparatus comprising:

discriminating means for discriminating the high speed reading mode and the direct reading mode;

a reader motor to convey a transmission original to be read; and motor control means for controlling said reader motor, said motor control means, when said discriminating means judges the direct reading mode, rotating the reader motor in a pull-in region and driving the reader motor synchronously with reading timing, and when the discriminating means judges the high speed reading mode, rotating the reader motor at a high speed in a pull-out region and driving the reader motor asynchronously with the reading timing.

2. An apparatus according to claim 1, further comprising reading means for reading the original to be transmitted as data to be read and control means for controlling said reading means, wherein said control means has said discriminating means for discriminating the reading mode.

3. An apparatus according to claim 1, wherein said reader motor is a stepping motor.

4. A facsimile apparatus comprising:

reading means for reading an original to be transmitted;

coding means for coding a data signal from said reading means;

memory means for storing the data coded by said coding means;

communicating means for communicating the data coded by said coding means or the data stored in said memory means; and control means for controlling said reading means, said coding means, said memory means, and said communicating means, said control means discriminating a high speed reading mode in which the data signal from the reading means is coded by the coding means and stored into the memory means and the stored data is communicated by the communication means, and a direct reading mode in which the data signal from the reading means is coded by the coding means and the coded data is communicated by said communicating means;

a reader motor to convey the original to be transmitted; and motor control means for controlling the reader motor, said motor control means, when the control means judges the direct reading mode, rotating said reader motor in a pull-in region and driving said reader motor synchronously with reading timing of said reading means, and when said control means judges the high speed reading mode, rotating said reader motor at a high speed in a pull-out region and driving the reader motor asynchronously with the reading timing of said reading means.

5. An apparatus according to claim 4, wherein when the control means judges the direct reading mode, said motor control means drives the reader motor synchronously with the reading timing of the reading means and drives the reader motor synchronously with the timing for coding by the coding means, and when the control means judges the high speed reading mode, said motor control means drives the reader motor asynchronously with the reading timing of said reading means and drives the reader motor asynchronously with the timing for the reading by the reading means, the coding by the coding means, and the storage by the memory means.

* * * * *